United States Patent
Spickermann et al.

(10) Patent No.: US 6,362,903 B1
(45) Date of Patent: Mar. 26, 2002

(54) USE OF HIGHER ORDER MODULATION TECHNIQUES TO TRANSMIT INFORMATION ON PASSBANDS OF A DISPERSION-LIMITED FIBER LINK

(75) Inventors: Ralph Spickermann, Redwood City; Julius Lange, Cupertino, both of CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/183,183

(22) Filed: Oct. 30, 1998

(51) Int. Cl.[7] .................................................. H04J 14/02
(52) U.S. Cl. ........................................ 359/124; 359/181
(58) Field of Search ................................... 359/124, 180, 359/181, 182; 375/260, 268

(56) References Cited

U.S. PATENT DOCUMENTS

| | | | |
|---|---|---|---|
| 4,584,692 A | * 4/1986 | Yazuka et al. | ............... 375/260 |
| 4,949,170 A | * 8/1990 | Yanagidaira et al. | ......... 725/93 |
| 5,640,423 A | * 6/1997 | Archer | ........................ 375/261 |
| 5,896,211 A | * 4/1999 | Watanabe | .................... 359/124 |
| 5,982,824 A | * 11/1999 | Ann | ............................ 375/345 |
| 5,999,561 A | * 12/1999 | Naden et al. | ................ 375/142 |

* cited by examiner

Primary Examiner—Jason Chan
Assistant Examiner—Christina Y Leung
(74) Attorney, Agent, or Firm—Kenneth W. Float

(57) ABSTRACT

Systems and methods employing higher order modulation techniques to transmit information on passbands of a dispersion-limited fiber optic communication link. The present invention transmits data on previously unused passbands of the dispersion-limited optic link, thus increasing the total capacity of the link. Higher order modulated carrier frequencies (M-ary ASK, PSK, QAM, etc.) centered within the higher passbands are transmitted using the present invention. Thus, the present invention combines a multiplicity of encoded carriers into a composite microwave spectrum that is tailored to the passbands of the optical link.

20 Claims, 3 Drawing Sheets

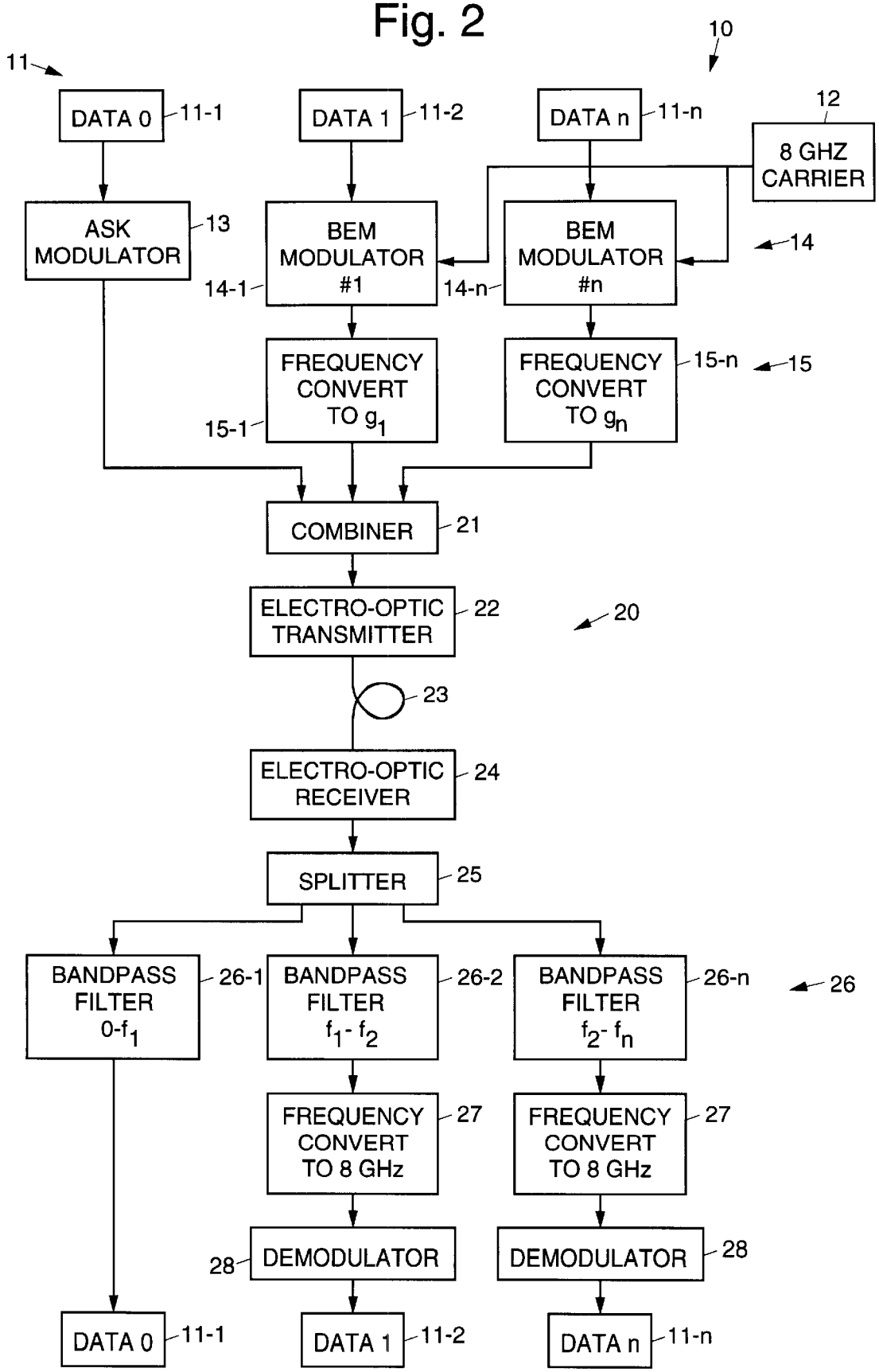

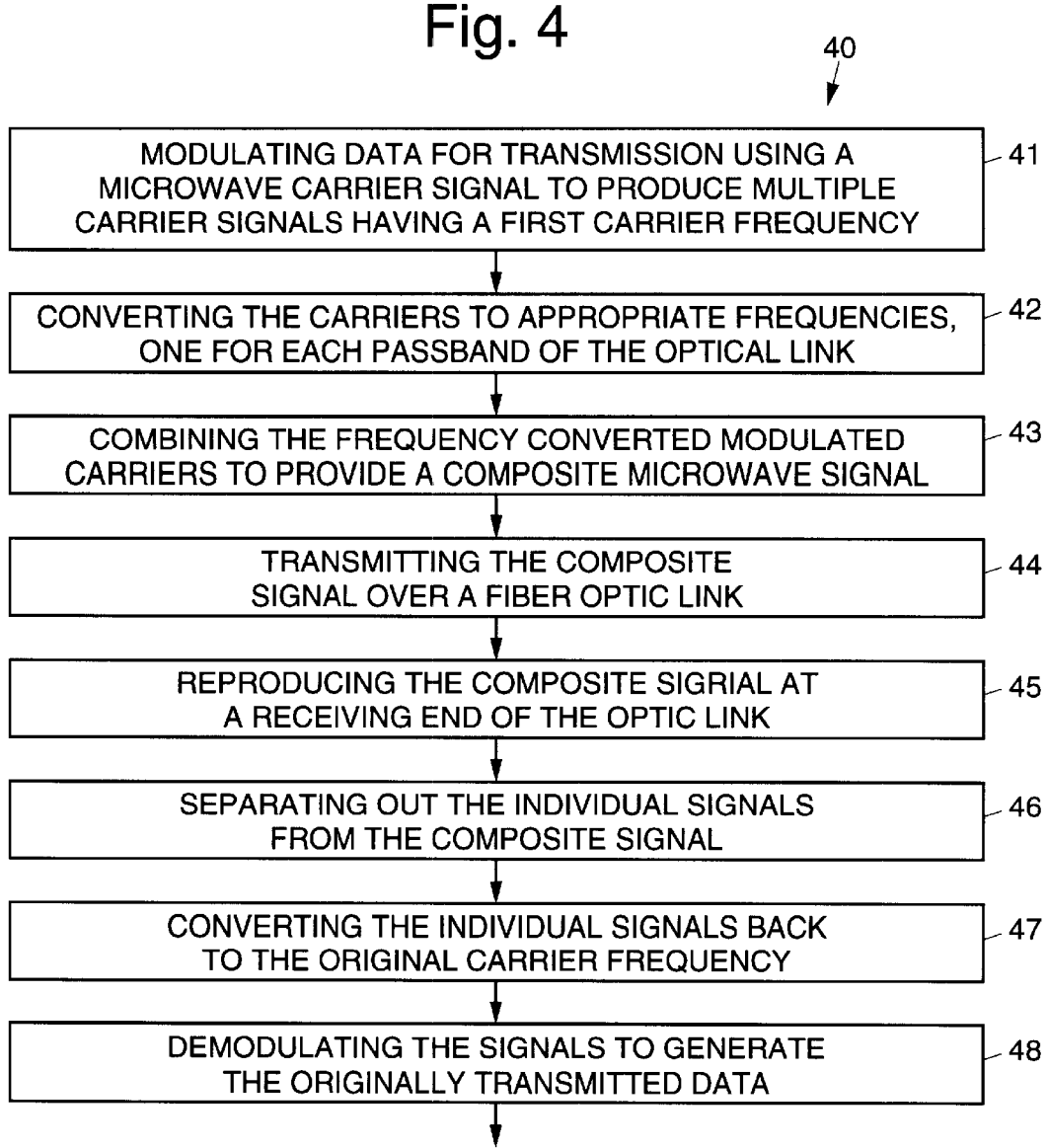

USE OF HIGHER ORDER MODULATION TECHNIQUES TO TRANSMIT INFORMATION ON PASSBANDS OF A DISPERSION-LIMITED FIBER LINK

BACKGROUND

The present invention relates generally to fiber optic communications systems, and more particularly, to the use of higher order modulation techniques to transmit information on passbands of a dispersion-limited fiber link.

The microwave response of an optical link is degraded by dispersive fiber. Laying fiber in the ground is the predominant cost driver in the fiber communication business. Dispersion causes passbands in the link. These passbands vary with distance. As the link length increases, the passbands narrow and have a smaller period.

The response of the dispersive fiber link can be flattened by several known techniques. One technique involves introducing dispersion of an equal magnitude but opposite sign at a receiver at the opposite end of the fiber. However, these techniques are expensive and introduce additional optical loss.

Non-dispersive fiber has been recently developed. However, almost all of the fiber in the ground today is dispersive. Consequently, techniques that can enhance the information carrying capacity of existing fiber are extremely desirable.

Various patents have been issued relating to transmission of information over a fiber optic link that were uncovered in a search relating to the present invention. These patents disclose apparatus and methods relating to canceling distortion, multiplexing and demultiplexing signals, communicating using multiple polarizations, correction of non-linear effects, optical transmission using optical phase conjugation, transmitting signals having different wavelengths over a same optical fiber, dispersion compensation, fault signaling, amplifiers, and filters. However, none of the patents uncovered in the search disclosed using higher order modulation techniques to transmit information on passbands of a dispersion-limited fiber link to increase the information carrying capacity of the link.

Therefore, it would be advantageous to have systems and methods that increase the information carrying capacity of fiber optic communication links.

SUMMARY OF THE INVENTION

The present invention provides for systems and methods that use higher order modulation techniques to transmit information on passbands of a dispersion-limited fiber optic link. The present invention provides for the transmission of data on previously unused passbands of the dispersion-limited optic link, thus increasing the total capacity of the fiber optic link.

The microwave response of a typical optical link is degraded by dispersive fiber, and there are nulls and passbands in the response. The prior art relating to optical link design utilizes only on-off keying in the first passband. The present invention, however, provides for the transmission of higher order modulated carrier frequencies centered within the higher passbands. Such higher order modulated carrier frequencies include M-ary amplitude shift keyed (ASK) modulation, M-ary phase shift keyed (PSK) modulation, and M-ary quadrature amplitude modulation (QAM), and the like. Use of these carriers does not preclude simultaneous use of the first band as in prior art. Thus, the present invention combines a multiplicity of encoded carriers into a composite microwave spectrum that is tailored to the passbands of the optical link.

Each of the carriers transmit additional data over the dispersive fiber compared to what is normally transmitted using the first band alone. This increases the information (data) carrying capacity of the fiber communication link employing the dispersive optical fiber.

An exemplary system comprises a plurality of modulators that modulate a plurality of data streams. The first modulator is an amplitude shift keyed (ASK) modulator, using either on-off keying or multiple amplitude steps. The remaining modulators encode their data streams on a carrier 12 using bandwidth efficient modulation. Numerous M-ary amplitude and phase shift keying methods may be used to produce the bandwidth efficient modulation.

A plurality of frequency converters are used to convert the carriers to a plurality of frequencies that are respectively centered within a passband of a fiber optic link. A combiner is used to combine the signals into a composite microwave spectrum that is transmitted over the fiber optic link. At the receiving end of the link, a splitter and a plurality of bandpass filters are used to separate the recovered spectrum is into its individual data streams. A plurality of frequency converters and a plurality of demodulators are used to extract the originally transmitted data from each data stream.

An exemplary method comprises the following steps. Data for transmission is modulated using a microwave carrier signal to produce multiple carrier signals having a first carrier frequency. The carriers are converted to appropriate frequencies, one for each passband of the fiber optic communication link. The frequency converted modulated carriers are then combined to provide a composite microwave signal. The composite signal is transmitted over the fiber optic communication link. The composite signal is reproduced at a receiving end of the fiber optic communication link. The individual signals are separated out from the composite signal, and are converted back to the original carrier frequency. The signals are then demodulated to generate the originally transmitted data.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 2 illustrates an exemplary system in accordance with the principles of the present invention that increases the information carrying capacity of a fiber communication link;

FIG. 4 is a flow chart that illustrates an exemplary data communication method in accordance with the principles of the present invention.

DETAILED DESCRIPTION

Figure 1:
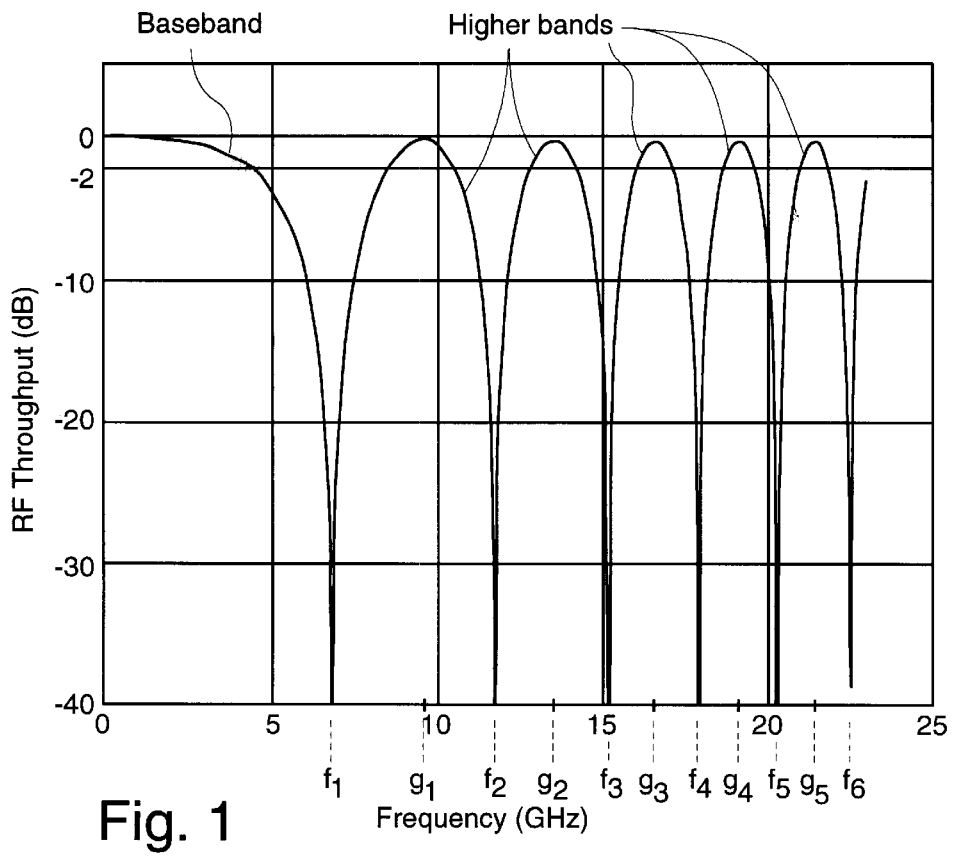
FIG. 1 illustrates the microwave response of an optical link degraded by dispersive fiber.

Referring to the drawing figures, FIG. 1 illustrates the microwave (RF) response of a fiber optic link degraded by a dispersive fiber. More specifically, FIG. 1 shows the microwave response of an 80 kilometer fiber optic link.

As is shown in FIG. 1, the dispersion causes passbands in the fiber optic link. These passbands vary with distance. As the length of the dispersive fiber optic link increases, the passbands narrow and have a smaller period. The RF throughput is given by the equation:

RF Throughput $\cos^2[(\pi LD/c)\lambda^2 f^2]$, where L=80 km, D=17 ps/km·nm, c=3×10⁸ m/s, λ=1.55 μm, and f is the microwave frequency.

At present, for metropolitan fiber links under 100 kilometers in length, fiber optic communication systems transmit simple on-off keying at baseband and accepts a bandwidth limitation on the order of 5 Gbits. In other words, the first null ($f_s$) is the limit of useable bandwidth for prior art systems. Given the current state of the art, it is cost effective (compared to anti-dispersion techniques) to continue the use of the normally used baseband.

However, and in accordance with the principles of the present invention, communication capacity through the dispersive fiber is improved by additionally using bandwidth efficient modulation (BEM) techniques (such as M-ary PSK, or QAM, or the like) on one or more carriers centered within one or more of the passbands beyond $f_1$ (higher passbands) of the dispersive fiber to increase the capacity of the fiber communication link.

FIG. 2 illustrates an exemplary system 10 in accordance with the principles of the present invention that increases the information carrying capacity of a fiber optic communication link 20 comprising an electro-optic transmitter 22 and an electro-optic receiver 24 interconnected by an optical fiber 23. The fiber optic communication link 20 may be one channel of a wavelength division multiplexed link 20, for example.

A plurality of data streams (DATA 0, DATA 1, ..., DATA n) 11 (11-1, 11-2, 11-n) are modulated by a plurality of modulators 13, 14-1, ..., 14-n. A first modulator 13 is an amplitude shift keyed (ASK) modulator, using either on-off keying (OOK) as in the prior art, or multiple amplitude steps.

The remaining modulators 14-1, ..., 14-n are bandwidth efficient modulators 14 that encode their data streams on a carrier 12, such as an 8 GHz carrier 12, for example, by means of bandwidth efficient modulation in accordance with the principles of the present invention. Any number of M-ary amplitude and phase shift keying methods may be used, as desired, to produce the bandwidth efficient modulation.

Figure 3:
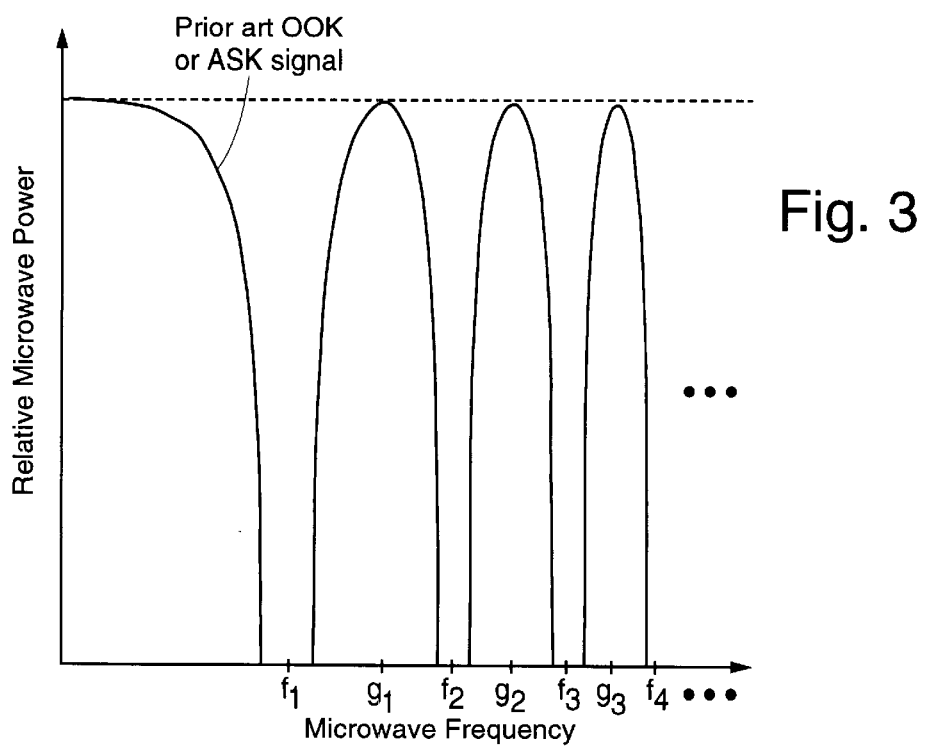
FIG. 3 illustrates an exemplary composite microwave data spectrum in accordance with the principles of the present invention.

FIG. 3 illustrates an exemplary composite microwave data spectrum in accordance with the principles of the present invention. This spectrum is used in conjunction with the microwave characteristics shown in FIG. 1. The BEM spectra in accordance with the present invention fit into the higher passbands (above $f_1$) shown in FIG. 1.

The 8 GHz carriers are then converted to a plurality of frequencies ($g_1, g_2, ..., g_n$) using a plurality of frequency converters 15 (15-1, ... 15-n), that are chosen such that each frequency is centered within a passband of the fiber optic communication link 20. The signals are combined in a combiner 21 into a composite microwave spectrum (as shown in FIG. 3) and are then transmitted over the fiber optic communication link 20.

After reception at the electro-optic receiver 24, the recovered spectrum is separated into its individual data streams using a splitter 25 and a plurality of bandpass filters 26 (26-1, ... 26-n). The originally transmitted data 11-1 ... 11-n is then extracted from each data stream. The data modulated using the bandwidth efficient modulation is extracted using a plurality of frequency converters 27 and a plurality of demodulators 28. The plurality of frequency converters 27 convert the carriers from the plurality of frequencies ($g_1, g_2, ..., g_n$) to produce the 8 GHz carriers 12, for example, and the plurality of demodulators 28 demodulate the bandwidth efficient modulation to generate the originally transmitted data 11-2 ... 11-n carried by the higher passbands.

The passbands of the dispersive fiber vary according to length of the fiber 23. However, field adjustable tuning of the carrier(s) may be employed to tailor the carriers to be in the center of the passbands. Stopbands formed by the dispersion in the fiber 23 act as natural filters to reduce crosstalk between the passbands.

Given the above discussion, FIG. 4 is a flow diagram that illustrates an exemplary method 40 in accordance with the principles of the present invention that increases the information (data) carrying capacity of a fiber optic communication link comprising a dispersive fiber. The method 40 comprises the following steps.

Data for transmission is modulated 41 using a microwave carrier signal to produce multiple carrier signals having a first carrier frequency. The carriers are converted 42 to appropriate frequencies, one for each passband of the fiber optic communication link. The frequency converted modulated carriers are then combined 43 to provide a composite microwave signal. This composite signal is transmitted 44 over the fiber optic communication link. The composite signal is reproduced 45 at a receiving end of the fiber optic communication link. The individual signals are separated out 46 from the composite signal, and are converted 47 back to the original carrier frequency used in step 41. The signals are then demodulated 48 to generate the originally transmitted data.

Each of the carriers transmit additional data over the dispersive fiber compared to what is normally transmitted using the lowest passbands alone. This, therefore, increases the information (data) carrying capacity of the fiber communication link employing the dispersive fiber. The one or more carriers may each be tuned 13 to be in the centers of the respective passbands. This may be achieved using field adjustable tuning of the one or more carriers.

Thus, a method that increases the information carrying capacity of existing fiber communication links has been disclosed. It is to be understood that the described embodiment is merely illustrative of some of the many specific embodiments which represent applications of the principles of the present invention. For instance, the modulation and demodulation does not have to occur at the same intermediate frequency for different passbands (8 GHz in the example). Clearly, numerous and other arrangements can be readily devised by those skilled in the art without departing from the scope of the invention.

What is claimed is:

1. A method for increasing the information carrying capacity of an optical communication link, comprising the steps of:

modulating data for transmission using a carrier signal to produce multiple carrier signals having a first carrier frequency;

converting the carriers to appropriate frequencies, one for a lowest order chromatic dispersion passband and one for each higher order chromatic dispersion passband of the optical communication link;

combining the frequency converted modulated carriers to provide a composite signal;

transmitting the composite signal over the optical communication link;

reproducing the composite signal at a receiving end of the optical communication link;

separating out the individual signals from the composite signal;

converting the individual signals back to the original carrier frequency; and demodulating the signals to generate the originally transmitted data.

2. The method recited in claim 1 wherein the one or more carriers are centered in the respective passbands.

3. The method recited in claim 1 wherein the step of modulating data for transmission comprises amplitude shift keyed modulating a first data stream using on-off keying, and encoding the remaining data streams on a carrier using bandwidth efficient modulation.

4. The method recited in claim 3 wherein the step of modulating data for transmission comprises amplitude shift keyed modulating a first data stream using multiple amplitude steps, and encoding the remaining data streams on a carrier using bandwidth efficient modulation.

5. The method recited in claim 3 wherein the bandwidth efficient modulation comprises M-ary amplitude shift keyed modulation.

6. The method recited in claim 3 wherein the bandwidth efficient modulation comprises M-ary phase shift keyed modulation.

7. The method recited in claim 3 wherein the bandwidth efficient modulation comprises M-ary quadrature amplitude modulation.

8. The method recited in claim 4 wherein the bandwidth efficient modulation comprises M-ary amplitude shift keyed modulation.

9. The method recited in claim 4 wherein the bandwidth efficient modulation comprises M-ary phase shift keyed modulation.

10. The method recited in claim 4 wherein the bandwidth efficient modulation comprises M-ary quadrature amplitude modulation.

11. A system that increases the information carrying capacity of an optical communication link, comprising:

a plurality of modulators for modulating a plurality of data streams, wherein a first modulator uses amplitude shift keyed modulation, and the remaining modulators use bandwidth efficient modulation;

a plurality of frequency converters for converting the carriers to appropriate frequencies, one for a lowest order chromatic dispersion passband and one for each higher order chromatic dispersion passband of the optical communication link;

a combiner for combining the signals into a composite microwave spectrum for transmission over the fiber optic communication link;

separation circuitry coupled to a plurality of bandpass filters for separating the composite microwave spectrum into its individual data streams, and extraction circuitry for extracting the originally transmitted data from the individual data streams.

12. The system recited in claim 11 wherein the fiber optic communication link comprises an electro-optic transmitter and an electro-optic receiver coupled together by way of an optical fiber.

13. The system recited in claim 11 wherein the fiber optic communication link comprises one channel of a wavelength division multiplexed link.

14. The system recited in claim 11 wherein the amplitude shift keyed modulator modulates the data streams using on-off keying.

15. The system recited in claim 11 wherein the amplitude shift keyed modulator modulates the data streams using multiple amplitude steps.

16. The system recited in claim 11 wherein the bandwidth efficient modulation comprises M-ary amplitude shift keyed modulation.

17. The system recited in claim 11 wherein the bandwidth efficient modulation comprises M-ary phase shift keyed modulation.

18. The system recited in claim 11 wherein the bandwidth efficient modulation comprises M-ary quadrature amplitude modulation.

19. The system recited in claim 11 wherein the separation circuitry comprises a splitter coupled to a plurality of bandpass filters.

20. The system recited in claim 11 wherein the extraction circuitry comprises a plurality of frequency converters and a plurality of demodulators.

* * * * *